United States Patent [19]
Rumfola

[11] Patent Number: 4,787,688
[45] Date of Patent: Nov. 29, 1988

[54] HOLOGON AND METHOD OF MANUFACTURING A HOLOGON

[75] Inventor: Ross E. Rumfola, Avon, N.Y.

[73] Assignee: Eastman Kodak Company, Rochester, N.Y.

[21] Appl. No.: 101,539

[22] Filed: Sep. 28, 1987

[51] Int. Cl.$^4$ .......... G02B 5/32; G02B 26/10; G03H 1/04; G03H 1/26
[52] U.S. Cl. .................. 350/3.71; 350/3.75
[58] Field of Search .......... 350/3.71, 3.75, 320, 350/162.11

[56] References Cited

U.S. PATENT DOCUMENTS 4,455,061  6/1984  Case ................ 350/3.75

FOREIGN PATENT DOCUMENTS 59-9625  1/1984  Japan ................ 350/3.71

Primary Examiner—John K. Corbin
Assistant Examiner—David J. Edmondson
Attorney, Agent, or Firm—John B. Turner

[57] ABSTRACT

A hologon and its method of manufacture are described. Adjacent facets of the hologon are overlapped so that the diffraction effects created by boundaries of the mask which defines the extent of the interference pattern, which is a precursor of the diffraction grating, are overlapped, thereby increasing the duty cycle.

5 Claims, 7 Drawing Sheets

HOLOGON AND METHOD OF MANUFACTURING A HOLOGON

BACKGROUND OF THE INVENTION

1. Field of the Invention

This invention relates to hologons and their methods of manufacture.

2. Description Relative to the Prior Art

As is known, a hologon is a device which, when rotated, causes a stationary beam directed at it to repetitively scan along a line. Hologons are known which comprise a disc mounted for rotation at high speed. The disc has, on a planar surface to which the axis of rotation is perpendicular, a plurality of sector-shaped facets. Each facet contains a diffraction grating. If there are 'n' facets, the inclination of grating lines in one facet to the lines in adjacent facets is $(360/n)°$. The lines may be 'tangential' or 'radial'. If 'radial', the lines of a facet are parallel to a radius which bisects the facet. If 'tangential', the lines are perpendicular to the radius which bisects the facet. The gratings may be reflective or transmissive. Hologons are also known which contain a single grating pattern. Such single facet hologons cause two scans per revolution. Multifaceted hologons having 'n' facets cause 'n' scans per revolution. Hologons are also known in which each facet has power.

It is known to make a hologon by coating a disc with photoresist. A radiation beam, usually a laser beam, is split and the resulting two beams are interfered at the photoresist coating so that the coating is exposed to a rectilinear interference pattern. The exposure creates in the photosensitive coating a precursor of a grating pattern. The extent of the precursor created is limited by a mask which has an aperture bounded in part by two, radially inner and radially outer boundaries and opposed lateral boundaries radial to the axis of rotation of the disc. The angle included between the lines is the same as the included angle of the facet, i.e. $(360/n)°$. After one facet has been exposed, the disc is rotated through an angle of $(360/n)°$ relative to the mask and the means for directing the radiation beams at the disc, and another facet is exposed. After all 'n' facets have been exposed, the coating is processed to produce operative gratings from the precursors in the photosensitive coating.

A problem exists with the above-described method of making hologons. This problem is that diffraction occurs at the two opposed lateral boundaries of the aperture in the mask. This diffraction creates a precursor in the photoresist which, upon processing of the coating, creates unwanted diffraction effects. The diffraction effects cause a reduction in the duty cycle of the hologon. Duty cycle has been understood to mean the percentage of time during which the scanner is useful. The scanner is, for example, not useful when the incident beam is incident on two facets. Some have regarded the duty cycle as being the percentage of time in which the beam is incident exclusively on only one facet. However, the scanner is also not useful when the beam is incident, partially or wholly, on the diffraction effects resulting from the fiffraction caused by the opposed lateral boundaries of the mask.

Obviously, at each junction between two facets there are two sets of diffraction effects, one for each facet and they extend from the junction clockwise or counter-clockwise, respectively, into the facet. The diffraction effects are of substatially constant width so that their effect on duty cycle varies with radial distance from the axis of rotation; it being greater the closer to the axis.

In FIGS. 1 and 2 there is illustrated a known hologon 20 which comprises a glass disc 22 with a coating 24 of photoresist. The disc 22 has an aperture 26 coaxial with the geometric axis 28 of the disc 22, for receiving a drive shaft (not shown) to which the hologon is secured for rotation in unison with the shaft.

The hologon 20, illustrated in FIG. 1, has six facets $F_1$–$F_6$ each subtending an angle of 60° at the axis 28. There are radial boundaries $B_{12}$, $B_{23}$, $B_{34}$, $B_{45}$, $B_{56}$ and $B_{61}$ between the facets $F_1$ and $F_2$, $F_2$ and $F_3$, and so on, respectively. Each facet has a radially inner boundary 23 and a radially outer boundary 25 both of which are arcs of respective circles. The facets may be termed generally sector-shaped even though they are sectors truncated by the boundaries 23.

The photoresist coating 24 in each facet has been exposed and processed to exhibit a diffraction grating pattern. The diffraction grating is a plurality of straight, closely spaced lines 30 (only a very few of which are shown in the drawing) which, when light is incident on the grating, cause diffraction of the light. In the present example, the lines 30 in each facet $F_1$–$F_6$ are parallel to a line $R_1$–$R_6$, respectively, which is a radius bisecting the respective facet. In other examples the lines in each facet are termed tangential and are perpendicular to the line $R_1$–$R_6$ in each respective facet.

The diffraction grating lines 30 in each facet $F_1$–$F_6$ are formed by interfering two coherent beams so that an interference pattern is created on the photoresist. The interference pattern creates in the photoresist a precursor of a grating pattern. A mast limits the extent of the interference pattern. After one exposure there is relative displacement so that another facet can be exposed. After all facets have been exposed, the photoresist is processed and the grating patterns result.

FIG. 3 illustrates schematically an apparatus 32 for creating the greating pattern precursors in the photoresist coating 24. The apparatus includes a rotary table 34 mounted from a base 38, for rotation about an axis 36. Drive means 40 are provided for driving the table 34 in rotation and for holding it in desired positions.

A prism assembly 42 is mounted from the base 38 by support structure 44. The prism assembly 42 has a beam splitting interface 46 between two prisms 48 and 50. The plane of the interface 46 contains the axis 36.

A mask 52 is disposed between the prism assembly 42 and the disc 22 and is supported by the support structure 44.

A laser 54 provides a source of coherent, substantially monochromatic light which is directed as collimated beam 56 at a face 58 of the prism assembly 42.

The mask 52 is illustrated in FIG. 4 and consists of an opaque plate 60 having an aperture 62. The aperture has a radially inner, smaller diameter circular arcuate boundary 64 and a larger diameter, radially outer circular arcuate boundary 66. The circular arcuate forms of the boundaries 64 and 66 have a common center 68. The other two boundaries 70 and 72 of the aperture 62, termed herein opposed lateral boundaries, are rectilinear and, as shown, are radial to the circular arcuate forms of the boundaries 64 and 66. The mask 52, supported by the support structure 44, is disposed with the center 68 on the axis 36.

For forming a hologon, a glass disc 22 with photoresist coating 24 thereon is positioned on the table 34.

The laser 54 is energized and its output beam 56 enters the prism assembly 42 through face 58. The beam is incident on the interface 46 which splits the beam into beam 74 and beam 76. Beam 74 is reflected off face 78 and leaves the prism assembly 42, as beam 80, through face 82. Beam 76 is reflected off face 84 and leaves the prism assembly 42, as beam 86, through face 88.

The prism assembly 42 is so located and the beam 56 is of such cross-sectional size and shape that the beams 80 and 86 fill the aperture 62. The beams 80 and 86 interfere and form an interference pattern on the photoresist coating 24. The interference pattern is a plurality of bright and dark parallel lines which are parallel to the radius $R_1$ from the axis 36, which radius bisects the angle included between opposed lateral boundaries 70 and 72 of the aperture 62 in the mask 52. After an appropriate duration of exposure, the laser 54 is switched off and the drive means 40 is energized to cause relative displacement of the laser and prism assembly and the disc 22. The relative displacement is performed by the drive means 40 rotating the table 34 on the base 38. In the present example, the halogon to be produced has six facets, therefore the drive means 40 rotates the table through exactly 60° i.e., (360/6)° and holds the table 34 in its new position. The exposure process is repeated and the table is again stepped. This procedure is repeated four more times so that precursors of the six facets $F_1$-$F_6$ are created in the photoresist coating 24 by the six interference patterns to which the coating is exposed.

As practiced prior to the present invention, the edges 70 and 72 of the aperture 62 have been radial to the center 68 and have included an angle of 60° and the center 68 has been on the axis 36.

It is a known fact of optics that when light passes an edge, it is diffracted. This occurs at boundaries 70 and 72 of the aperture 62 in the mask. The diffraction causes a region of diffraction effects in the form of an interference pattern of dark and bright lines parallel to the edge and within the area exposed through the mask aperture. FIG. 5 illustrates a portion of the interference patterns at each side of a boundary, for example, $B_{12}$, between two facets $F_1$ and $F_2$ after processing of the precursors. It will be recognized: that the lines illustrated in FIG. 5 are those created by diffraction at the boundaries 70 and 72; that they are not the lines created by interference of the beams 80 and 86 which lines are too fine to show in the photograph from which FIG. 5 is reproduced; and that they are parallel to the boundaries 70 and 72 (and to the boundary $B_{12}$) and not parallel to the bisector R of the facet.

FIG. 6 represents the intensity of light in the interference pattern which is represented to the right of boundary $B_{12}$ in FIG. 5. The location of boundary $B_{12}$ is drawn in FIG. 6 to aid understanding.

The interference pattern, termed herein diffraction effects, created by diffraction at the boundaries 70 and 72 of the mask aperture 62 creates a percursor in the photoresist which creates a line pattern when the photoresist coating is processed. The line pattern resulding from the diffraction reduces the angular extent of the facet which is usable and hence the duty cycle of the hologon is reduced. Such reduction is undesirable and it is a purpose of the present invention to reduce the reduction and to more nearly approach the theoretical duty cycle.

The diffraction produced interference patterns illustrated in FIG. 5 extend to both sides of the boundary, e.g., $B_{12}$ as illustrated, as is represented in FIG. 7. FIG. 7 represents the regions of diffraction effects in three facets $F_1$, $F_2$ and $F_6$, with manufacture in accordance with the prior art. Each region is shown as having a width D in which the hologon is not usable. Thus, at each boundary B there is a width 2D which is not usable. It will be recognized that the region clockwise from boundary $B_{12}$ is created when facet $F_2$ is being exposed and the pattern counterclockwise from boundary $B_{12}$ is created when the facet $F_1$ is being exposed.

SUMMARY OF THE INVENTION

It is an object of the present invention to increase the duty cycle by decreasing the width (i.e., the angular extent when considered at a particular radius) of the diffraction effects.

According to the present invention, the precursors created by the diffraction at the lateral boundaries of adjacent facets are overlapped one over the other rather than created in adjacent contiguous but non-overlapping regions of the photosensitive layer. This is achieved by making the aperture in the mask subtend an angle greater than (360/n)°, wherein n is the number of facets. The overlap may be such thatone diffraction effect lies entirely on top of another or it may be such that there is just some, rather than total, overlap. The greatest advantage is achieved when there is total overlap.

According to the present invention there is provided a method of manufacturing a halogon having a plurality 'n' of facets, including providing a substrate having an axis about which the hologon is rotated in use. A photosensitive layer is provided on the substrate. Beams of radiation from beam-producing means are directed at the photosensitive layer to create an interference pattern on the layer to form in the layer a precursor of a diffraction grating. The beams are masked with a mask whereby the interference pattern is only a preselected region of the layer having an arcuate extent slightly greater than (360/n)° measured at the axis. The substrate, on the one hand, and the beams and mask, on the other hand, are relatively rotationally displaced through an angle of (360/n)° about the axis. The aforesaid steps of directing beams and masking the beams are repeated whereby an interference pattern is created on and a diffraction grating precursor is formed in, a second preselected region of the photosensitive layer similar in size to, and slightly overlapping, the first-mentioned region, whereby diffraction effects created by an edge of the mask during the creation of the interference pattern in said second region overlap the diffraction effects created by another edge of the mask during the creation of the interference pattern in the first-mentioned region. The photosensitive layer is processed, whereby diffraction gratings are created from the precursors formed in the photosensitive layer by the interference patterns.

The present invention also resides in a hologon having a plurality of facets, including a substrate having an axis about which the substrate is rotated in use. Each facet has radially inner, radially outer and opposed lateral boundaries. There is a coating on the substrate, which coating has been formed by processing a photosensitive material. Each of the facets includes a diffraction grating pattern in the coating, a precursor of the diffraction grating pattern having been formed optically in the photosensitive material by means including a mask. Each of the diffraction grating pattern includes lines extending parallel or perpendicular to a radius from the axis bisecting the facet. Each facet also includes two regions of diffraction effects contiguous, respectively, one with each of the opposed lateral boundaries of the facet; the diffraction effects having resulted from diffraction at the edges of the mask. Each of the regions of diffraction effects includes lines parallel to the opposed lateral boundary to which the respective region of diffraction effects is contiguous. Each facet overlaps its adjacent facets and each region of diffraction effects overlaps a region of diffraction effects of an adjacent facet.

DETAILED DESCRIPTION OF THE PREFERRED EMBODIMENT

Figure 1:
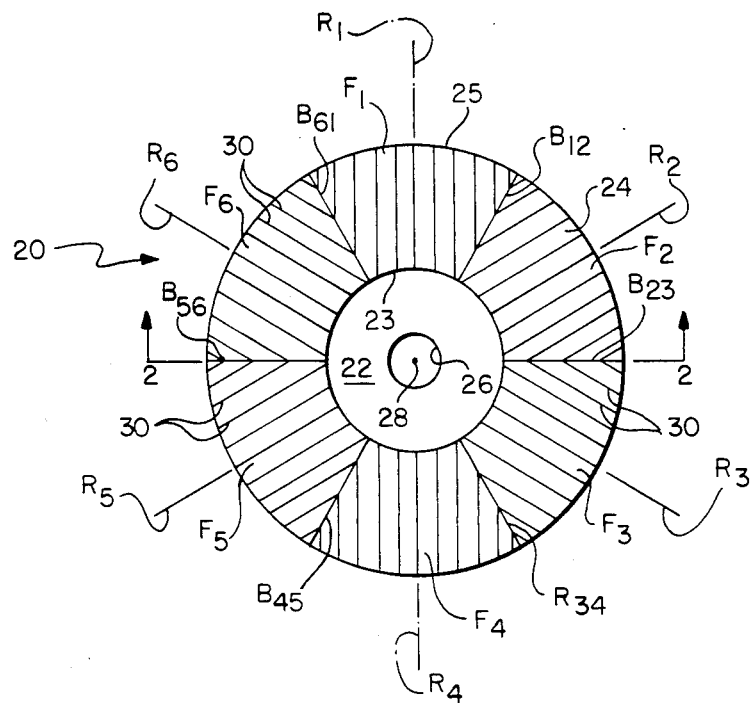
FIG. 1 represents a plan view of a known hologon.
Figure 2:
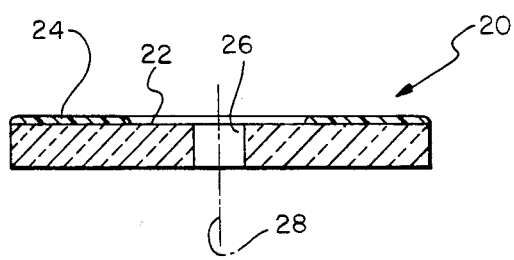
FIG. 2 is a cross-sectional view taken on the line 2—2 in FIG. 1.
Figure 3:
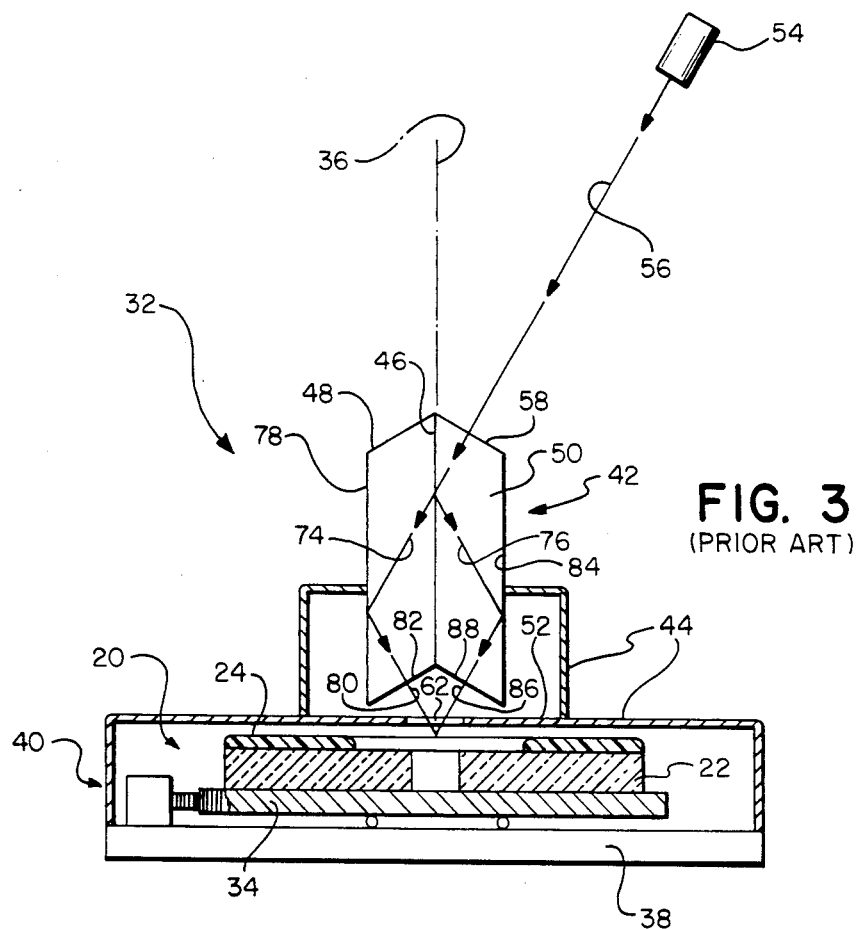
FIG. 3 is a schematic representation of an apparatus for manufacturing hologons.
Figure 4:
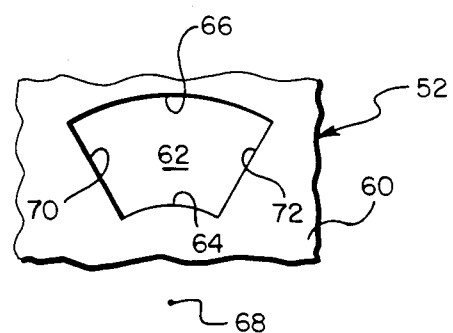
FIG. 4 is a view of a mask included in the apparatus illustrated in FIG. 3.
Figure 5:
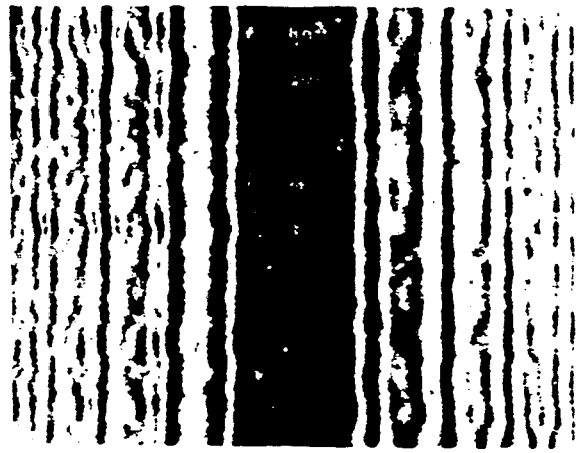
FIG. 5 represents diffraction patterns created during the manufacturing process.
Figure 6:
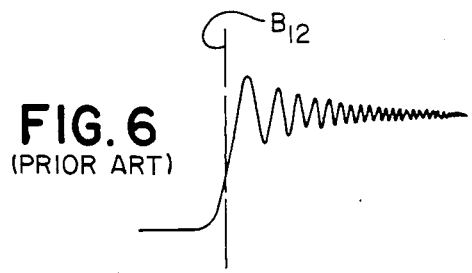
FIG. 6 represents the intensity in a portion of the diffraction pattern illustrated in FIG. 5.
Figure 7:
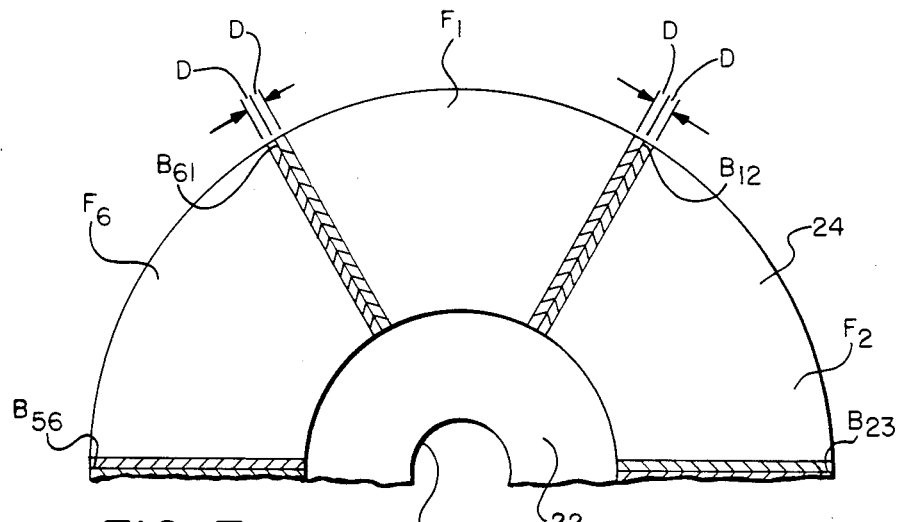
FIG. 7 represents a portion of the hologon according to the prior art and as illustrated in FIG. 1 with the regions containing the diffraction patterns, illustrated in FIG. 5, indicated.
Figure 8:
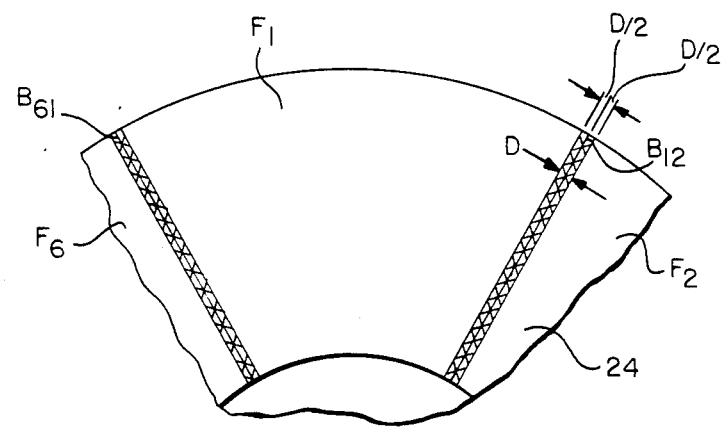
FIG. 8 is a representation similar to FIG. 7 but embodying the present invention.
Figure 9:
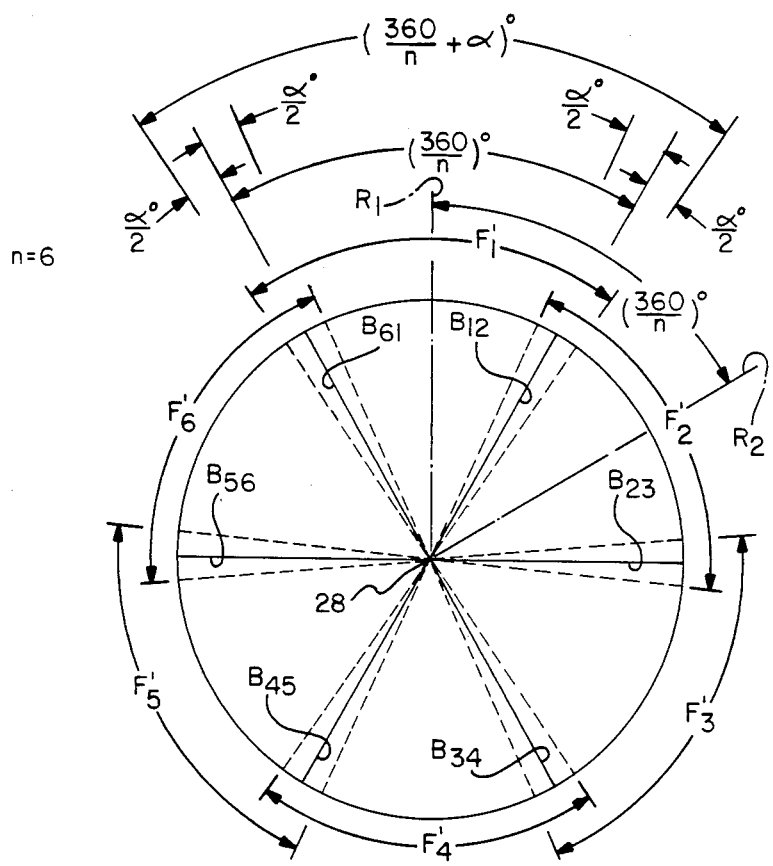
FIG. 9 is a schematic diagram usable in a determination of a dimension of the aperture of a mask in practicing the present invention, the mask being generally as illustrated in FIG. 4.
Figure 10:
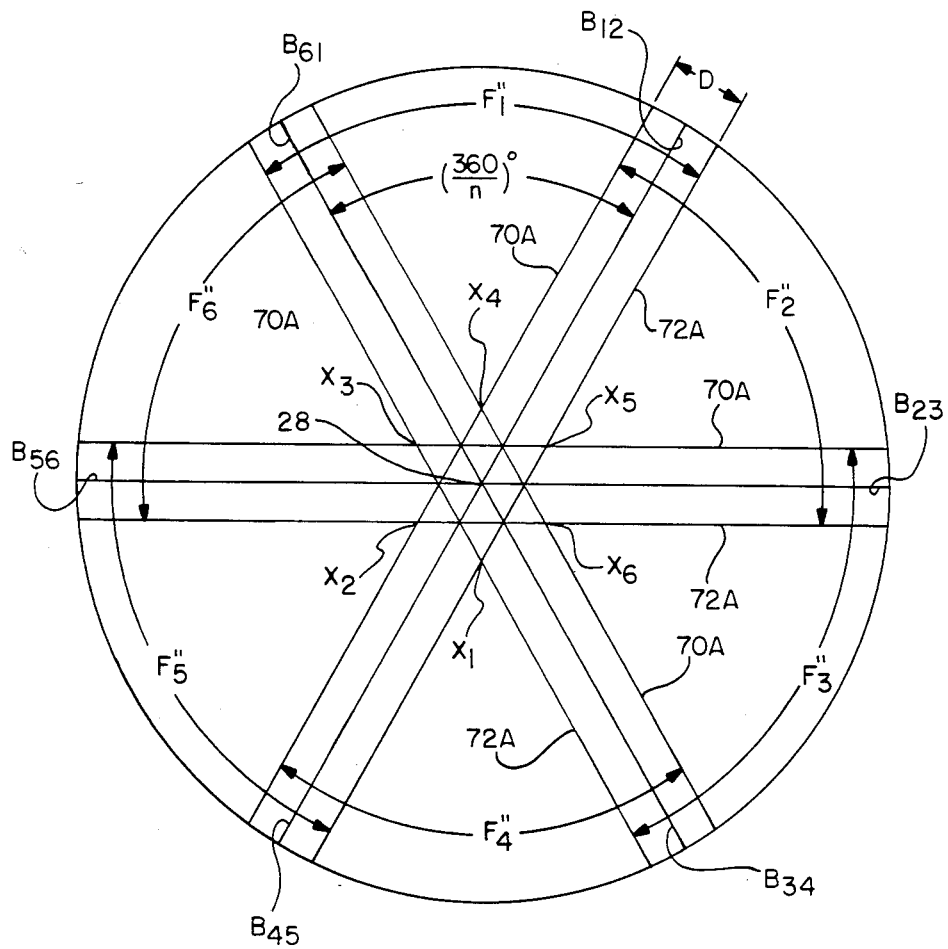
FIG. 10 is another schematic diagram usable in another determination of a dimension of the aperture of a mask.

In accordance with the present invention, the diffraction produced interference patterns are overlapped, for example, as illustrated in FIG. 8 so that the width dimension of the unusable region may be as little as D. FIG. 8 shows the pattern fully overlapped but in other embodiments the patterns are partially overlapped. Such other embodiments also give improvements in the duty cycle although not the maximum achievable improvement. The overlapping of the diffraction patterns is achieved by giving the aperture 62 in the mask 52 an extent, considered in an arcuate sense about the center 68, greater than $(360/n)°$, wherein n is the number of facets. The aperture may be given such greater extent by increasing the angle included between boundaries 70 and 72 to an angle greater than $(360/n)°$ or the included angle can be $(360/n)°$ with the intersection point of the boundaries 70 and 72 spaced from and behind the axis 36. FIG. 9 represents the former embodiment and FIG. 10 represents the latter embodiment.

In FIGS. 8 to 12, the boundaries $B_{12}$, $B_{23}$, etc. of facets are included to aid understanding. However, they no longer exist in embodiments of the present invention. They can, however, be regarded as indicating the boundaries of $(360/n)°$ sectors of the hologon (n being the number of facets).

It will be apparent that the embodiment represented in FIG. 9 leads to an overlap of the diffraction patterns which varies in width, i.e., the dimension considered in the arcuate or tangential sense, with radius. On the other hand, the embodiment represented in FIG. 10 gives an overlap which is of uniform width independent of radius. While the former might initially seem to be less preferable than the latter, it should be borne in mind that the use of a hologon is probably known during its manufacture and hence the radius at which the small cross-section beam is incident, in use, on the hologon is also known. Thus, the angle included between the two boundaries 70 and 72 can be so selected that the overlap of the two regions of diffraction effects has the desired extent, in the arcuate, or tangential sense, at the radius at which the light beam will be incident on the hologon in use. With such an arrangement, radially outwardly from the selected radius the overlap will be excessive and radially inwardly from the selected radius, the overlap will be less than that which provides the maximum duty cycle.

Figure 11:
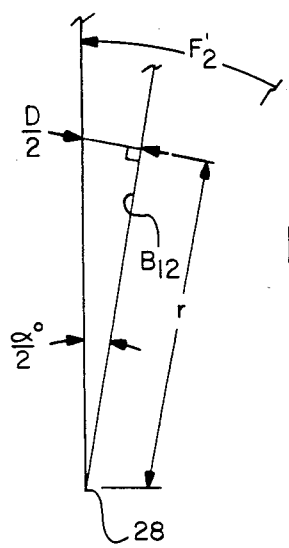
FIG. 11 is a diagram of how an angular value in FIG. 9 is derived.

The angle by which the aperture should be 'opened up' if the radius at which the beam is incident on the hologon is 'r' and the width of the diffraction pattern is again D, is given by $$\alpha = 2 \tan^{-1}(D/2r)$$

as may be understood from FIG. 11. Thus, the angle included between boundaries 70' and 72' of the mask would be $((360/n)° + \alpha)$ or $((360/n)° + 2\tan^{-1}(D/r))$. In FIG. 9, the facets are designated $F_1'$–$F_6'$ and subtend an angle of $((360/n) + \alpha)°$ at the axis 28.

Figure 12:
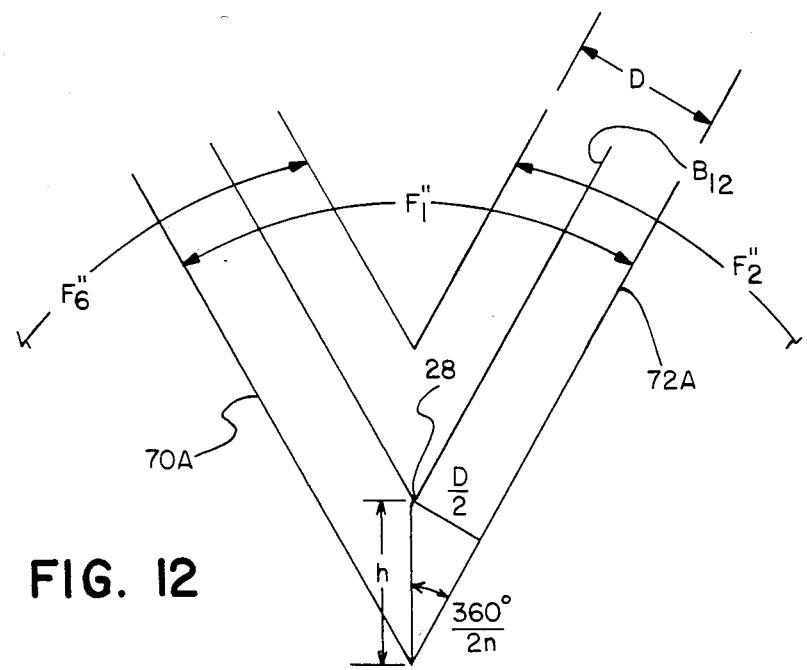
FIG. 12 is a diagram of how a dimension in FIG. 10 is derived.

FIG. 10 illustrates an alternative arrangement in which the angle included by the lateral boundaries of the mask is $(360/n)°$ but the point of intersection of the lines of the lateral boundaries is displaced behind the axis 28. In FIG. 10, the facets are designated $F_1''$–$F_6''$ but the projections of the lateral boundaries of the mask onto the photosensitive coating 24 are designated 70A and 72A, respectively. The point of intersection of the lines of the lateral boundaries of the mask is designated X. Such lateral boundaries may be regarded as approximately radial. Thus, the point of intersection of the lines of the mask edges when: facet $F_1$ is being exposed, is designated $X_1$; facet $F_2$ is being exposed, is designated $X_2$; etc. It will be observed that the points $X_1$–$X_6$ lie on a circle whose radius is h. FIG. 12 represents the relationship between h and the dimension D which again is the width of the area of diffraction effects created during each exposure and which is unusable. In FIG. 10, the unusable areas are shown overlapped with a width dimension D. It will be understood that $$h = \frac{D}{2 \sin\left(\frac{360}{2n}\right)}$$

In the description above, two specific ways of overlapping the precursors of the diffraction gratings have been described. It is to be understood that in other embodiments other ways of overlapping the diffraction patterns formed by diffraction at the mask edges may be adopted.

The invention has been described in detail with particular reference to a presently preferred embodiment, but it will be understood that variations and modifications can be effected within the spirit and scope of the invention.

What is claimed is:

1. A method of manufacturing a hologon having a plurality, 'n', of facets, including the steps of:

providing a substrate having an axis about which the hologon is rotated in use;

providing a photosensitive layer on said substrate;

directing beams of radiation from being producing means at said photosensitive layer to create a first interference pattern on said layer to form in said layer a precursor of a diffraction grating;

masking said beams with a mask whereby said interference pattern is on only a preselected region of said layer having an arcuate extent slightly greater than $(360/n)°$, measured at said axis;

relatively rotationally displacing said substrate and said beams and mask through an angle of $(360/n)°$ about said axis and repeating the aforesaid steps of directing beams and masking said beams whereby an interference pattern is created on, and a diffraction grating precursor is formed in, a second preselected region of said photosensitive layer similar in size to and slightly overlapping the first-mentioned region, whereby diffraction effects created by an edge of said mask during the creation of the interference pattern in said second region overlap the diffraction effects created by another edge of said mask during the creation of the interference pattern in the first-mentioned region;

and processing said photosensitive layer whereby diffraction gratings are created from said precursors formed in the photosensitive layer by the interference patterns.

2. A method as claimed in claim 1, wherein:

each said region has sides radial to said axis, whereby the overlapping diffraction effects reside in an area which tapers towards said axis.

3. A method as claimed in claim 1, wherein:

each said region has sides the lines of which intersect at a point spaced from said axis and at the side of said axis remote from said region, whereby the overlapping diffraction effects reside in areas which are generally parallel sided.

4. A method of manufacturing a hologon having an axis of rotation and a number 'n', greater than one, of generally sector-shaped facets uniformly disposed about said axis, the hologon being intended to have incident upon it, at a radial distance r from said axis, a beam of radiation which is converted from stationary to scanning by rotation of the hologon about said axis, including:

providing a substrate;

providing a photosensitive layer on said substrate;

directing beam of radiation at said photosensitive layer to create a first interference pattern on said layer;

masking said beams with a mask having an aperture bounded in part by first and second bounding edges which are radial or approximately radial to said axis, the angle subtended at said axis by an arc at said radius r and extending between said first and second bounding edges being greater by alpha degrees than $(360/n)°$, whereby a first precursor of a grating pattern is formed in the photosensitive layer, said precursor occupying a generally sector-shaped region having an arcuate extent, at said radius r, subtending an angle of $(360/n)°$, plus alpha degrees, at said axis;

relatively rotationally displacing said substrate and said beams and mask and creating another interference pattern which creates a precursor of another grating pattern with the lines of said another grating pattern inclined at an angle of $(360/n)°$ to the lines of the first grating pattern, said another precursor overlapping said first precursor by an arcuate extent at said radius r which subtends an angle of alpha degrees measured at said axis, whereby a precursor of a diffraction pattern created by the first bounding edge of said aperture during the creation of the first interference pattern overlaps a precursor of a diffraction pattern created by the second bounding edge of said aperture during the creation of said another interference pattern; and processing said photosensitive layer to form diffraction gratings.

5. A hologon having a plurality of facets, including:

a substrate having an axis about which the substrate is rotated in use;

each facet having radially inner, radially outer and opposed lateral boundaries, a coating on said substrate, said coating having been formed by processing a photosensitive material;

each of said facets including a diffraction grating pattern in said coating, a precursor of said diffraction grating pattern having been formed optically in said photosensitive material by means including a mask, each of the diffraction grating patterns including lines extending parallel or perpendicular to a radius from said axis bisecting the facet, each facet also including two regions of diffraction effects contiguous respectively one with each of the opposed lateral boundaries of the facet, said diffraction effects resulting from diffraction at edges of the mask, each of said regions of diffraction effects including lines parallel to the opposed lateral boundary to which the respective region of diffraction effects is contiguous, each facet overlapping its adjacent facets and each region of diffraction effects overlapping a region of diffraction effects of an adjacent facet.

* * * * *